Dec. 15, 1959    J. H. STREATER    2,917,194
BOAT TRAILER AND CRADLE
Filed Dec. 5, 1957    2 Sheets-Sheet 1
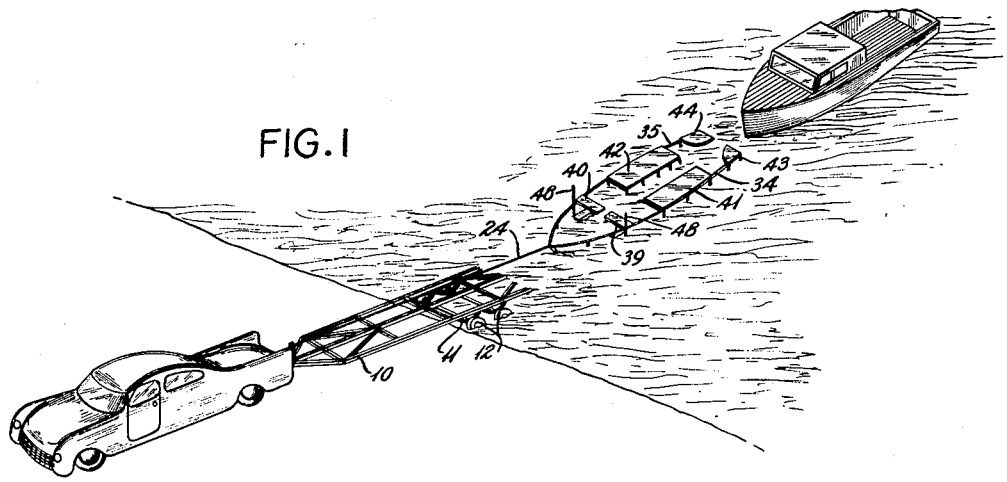
FIG. 1
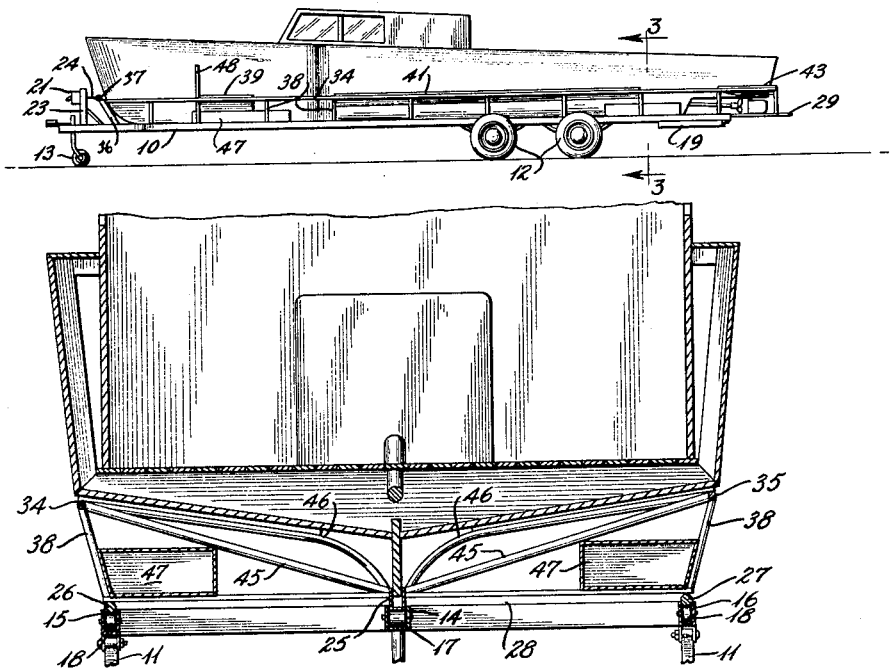
FIG. 2
FIG. 3
INVENTOR
J.H. STREATER
BY *Ayates Dowell*
ATTORNEY Dec. 15, 1959  J. H. STREATER  2,917,194
BOAT TRAILER AND CRADLE
Filed Dec. 5, 1957  2 Sheets-Sheet 2
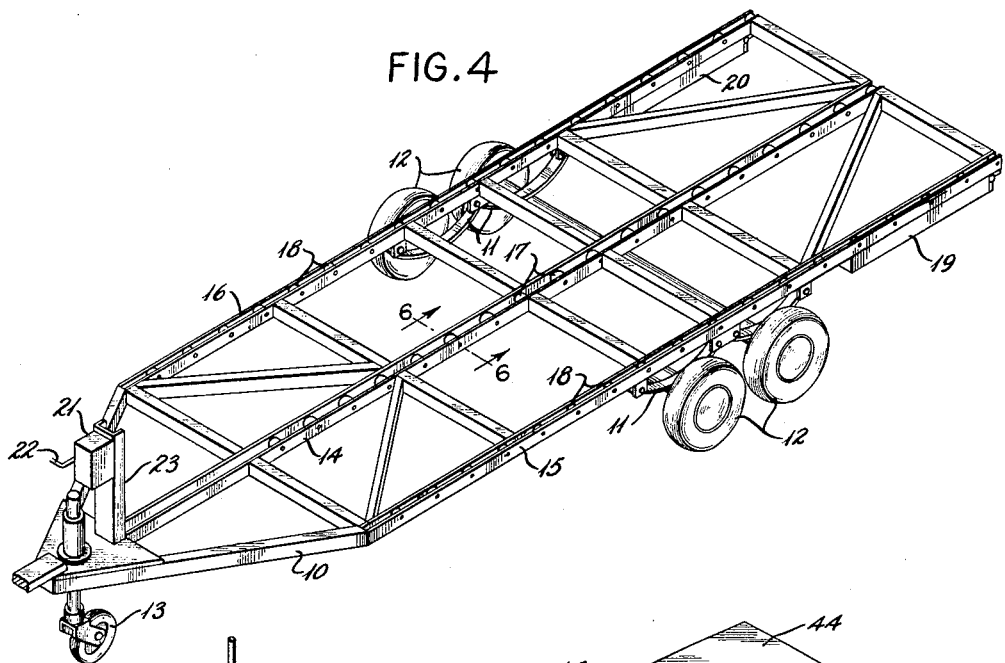
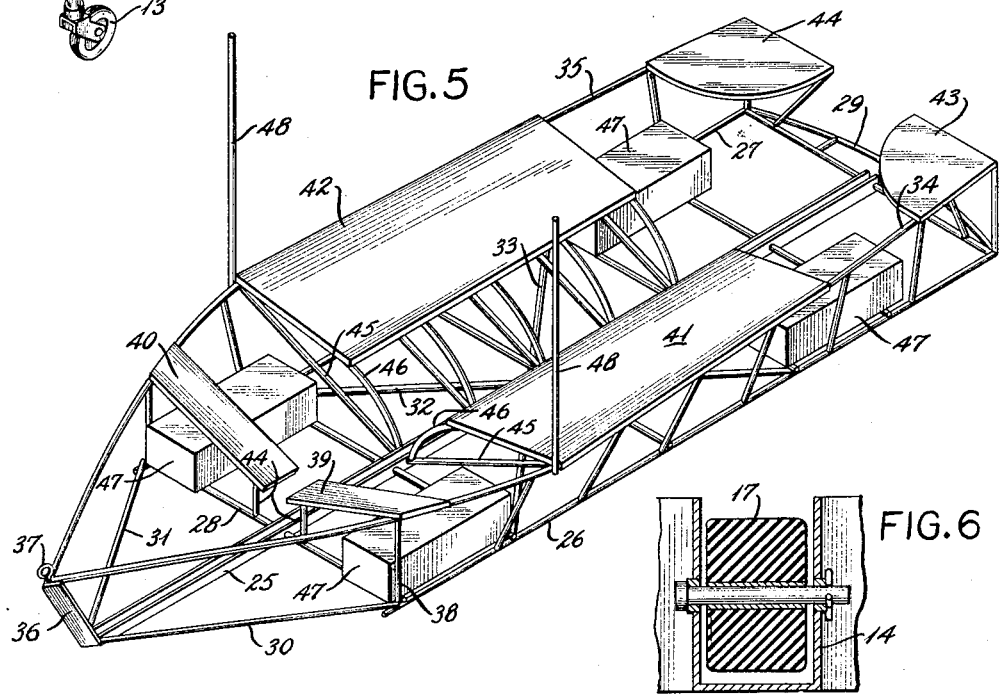
INVENTOR
J.H. STREATER
BY *Yates Dowell*,
ATTORNEY United States Patent Office 2,917,194
Patented Dec. 15, 1959

2,917,194

BOAT TRAILER AND CRADLE

James Harold Streater, Lakeland, Fla.

Application December 5, 1957, Serial No. 700,824

3 Claims. (Cl. 214—500)

This invention relates to the handling and transportation of commodities including vehicles which travel on both land and water, and more particularly to a boat trailer by which a boat may be loaded, hauled to a body of water, and unloaded into the water, as well as taken from the water, loaded on the trailer and hauled back to the initial location.

The invention is particularly concerned with a trailer of the character indicated, which can be towed by attaching the same behind another vehicle such as a passenger or other automobile which provides the necessary motive power for such transportation.

Numerous types of vehicles have been produced for hauling boats to and from a body of water including trailers constructed to be towed behind automobiles. Prior devices have not been satisfactory for various reasons including the fact that they were complicated, clumsy and expensive and required a great amount of effort, strength and skill in their use, particularly in the loading and unloading of a boat.

It is an object of the invention to provide a simple and relatively inexpensive boat trailer by which a boat may be readily loaded onto or unloaded from a trailer by a single individual regardless of whether the loading is for the purpose of taking the boat to the water or removing it from the water to return it to its original location.

Another object of the invention is to provide a boat trailer having a vehicle frame or chassis and a removable boat supporting cradle made buoyant with air tanks so that it will float and with such cradle including longitudinal members which roll on longitudinally trackways on the chassis thereby to facilitate loading and unloading of the cradle and boat.

Another object of the invention is to provide a boat hauling trailer which will provide adequate support not only for the center and sides but for substantially the entire bottom of the boat and in addition will have an effective protective framework or guard for the propellor and rudder of the boat.

Other objects and advantages of the invention will be apparent from the following description taken in conjunction with the accompanying drawings wherein:

Fig. 1 is a perspective illustrating one embodiment of the invention, the trailer being attached to an automobile and a boat being in a position to be assembled with the cradle and the cradle and boat to be subsequently pulled onto the trailer;

Fig. 2, a side elevation of the cradle-supported boat on the trailer;

Fig. 3, an enlarged fragmentary vertical section on the line 3—3 of Fig. 2;

Fig. 4, an enlarged perspective of the trailer itself;

Fig. 5, an enlarged perspective of the cradle; and

Fig. 6, a further enlarged section on the line 6—6 of Fig. 4.

Briefly stated the present invention comprises a vehicle trailer and a complementary buoyant boat cradle so constructed that the cradle may pull easily onto or from the trailer and the cradle being of such a structure that it so conforms to the sides and bottom of the boat that it has relatively large supporting contact with the sides and bottom of the boat and protectively guards the propeller and rudder of the boat. Also the cradle with the boat thereon can be moved into the water and the boat readily released from the cradle or the boat moved onto the cradle and pulled onto the chassis of the trailer with little effort by one person.

When loading a boat which is in the water, the floating cradle is rolled along the anti-friction rollers of the trailer and off the trailer into water. The floating cradle is then forced beneath the water directly under the boat and released. The floats thereupon cause the cradle to return upward and nest against the underside of the boat. The towline 24 of the cradle is then wound upon the winch of the trailer drawing the cradle and consequently the boat out of the water and onto chassis of the trailer in the position illustrated in Fig. 2.

With continued reference to the drawings, the vehicle trailer of the present invention has a frame 10 supporting springs 11, on dual wheels 12, with the front end of such trailer supported by a caster wheel 13 until such time as it is attached to a propelling vehicle.

The frame 10 is provided with a center channel 14 and left and right channels 15 and 16, the center channel being slightly wider and heavier than the side channels since it is in effect the main frame. The center channel is provided with a series of longitudinally spaced rollers 17 and the side channels are provided with a series of longitudinally spaced rollers 18. The rollers 17 preferably are resilient to cushion the siding of the cradle thereon without damage as well as to distribute the weight.

Pivoted legs 19 and 20 may be provided at the rear end of the frame and may be lowered when used and raised when not in use. A winch 21 operated by a crank 22 may be mounted on a support 23 at the front of the trailer so that a pulling force may be exerted by means of a suitable cable 24, as illustrated in Figs. 1 and 2.

In order adequately and properly to support a boat, a cradle is provided having a lower framework composed of a central U-shaped channel 25 and a pair of side bars or runners 26 and 27. The channel member 25 presents a depending rib which is adapted to roll upon rollers 17, and side members 26 and 27 present a depending rib at each side adapted to roll upon the rollers 18 in the side channels 15 and 16 of the trailer.

The longitudinal members 25, 26 and 27 are connected by cross bars 28, a rear guard rail 29, and a pair of converging front braces 30 and 31 along the bottom of the cradle. The rear guard rail 29 of the cradle provides a rear bumper for the boat trailer assembly when hauling the boat on the trailer upon land from place to place as illustrated in Fig. 2. By its extending outwardly beyond the outermost portions of the cradle, boat, and trailer, the guard further acts as a protective rail around the propeller and rudder of a boat. Also the bottom of the cradle is provided with angular braces 32 and 33 which extend diagonally from side to side between side members 26 and 27. Spaced above frame members 26 and 27 are similar upper frame members 34 and 35, with such members converging at the front end of the cradle and being connected to a low bracket 36 having its lower end attached to the members 30 and 31 and with an eye-bolt 37 attached to its upper end affording means by which the cradle may be towed. Also the cradle is provided at each side with a series of vertical braces or stanchions 38 which connect the upper and lower frame members.

A series of pairs of inwardly extending hull supporting plates are provided including plates 39 and 40 at the front, 41 and 42 along the center area, and 43 and 44 at the rear of the cradle. These plates are disposed at an angle complementary to the angle of the surfaces of the bottom of the boat for snug engagement therewith, the keel of the boat resting in the channel 25. The inner adjacent ends of the plates 39 and 40 are supported by uprights or braces 44 while angularly disposed braces 45 extend between the outer edges of the plates 41 and 42 and the channel member 25, bowed braces 46 also support the adjacent inner edges of the braces 41 and 42 on the channel member 25. The hull engaging plates prevent any undue stress and strain on the hull of the boat during transit.

The construction described provides a relatively sturdy cradle or supporting unit for a boat and is provided with a series of floats 47, four of which are shown, to cause the cradle to float. These provide sufficient buoyancy to maintain the cradle under the boat when in the water but permit the cradle to be depressed easily in moving the boat into position onto or from the cradle. Suitable upright guides 48 may be provided one on each side of the cradle, to facilitate loading and unloading of the boat on the cradle.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A device for transporting a boat comprising a trailer having spaced parallel longitudinal runways, anti-friction rollers journaled transversely in said runways, a boat supporting buoyant cradle separable from said trailer and having a frame work including parallel longitudinal members spaced corresponding to the spacing of said runways for movement along the same in the loading and unloading operation of said cradle, said cradle having a top of a configuration complementary to that of the bottom of a boat to be transported for supporting said boat over a substantial area of its bottom, said cradle having a central longitudinally disposed keel-supporting frame member and side members for supporting the undersides of said boat, the frame work of said cradle including a rear transverse portion providing a guard for the rear of the boat and for the propeller and rudder said keel-supporting frame member including plurality of supporting members extending inwardly and transversely of the length of the cradle and tapering downwardly at the center of the cradle for receiving the keel of the boat, with certain of said supporting members being positioned intermediate the ends of the cradle.

2. The structure of claim 1 including a winch assembly on said trailer for launching and retrieving the cradle and a boat cooperating therewith.

3. The structure of claim 1 wherein the cradle includes a plurality of floats mounted along each side thereof of a size and capacity to maintain the cradle afloat under its own weight and to allow the cradle to be readily depressible beneath the surface of the water to assemble together as well as separate the cradle and boat for loading and unloading.

References Cited in the file of this patent

UNITED STATES PATENTS

| | | |
|---|---|---|
| 1,751,639 | Junkers | Mar. 25, 1930 |
| 2,361,951 | Livermon | Nov. 7, 1944 |
| 2,389,338 | Zorc | Nov. 20, 1945 |
| 2,485,793 | Vassar | Oct. 25, 1949 |
| 2,594,773 | Harris | Apr. 29, 1952 |